Oct. 13, 1942.                J. H. ONIONS                2,298,584
                    PACKING RING, CUP WASHER AND THE LIKE
                           Filed May 20, 1940

INVENTOR
John H. Onions
By Stevens and Davis
ATTYS.

Patented Oct. 13, 1942

2,298,584

UNITED STATES PATENT OFFICE 2,298,584

PACKING RING, CUP WASHER, AND THE LIKE

John Henry Onions, London, England

Application May 20, 1940, Serial No. 336,293
In Great Britain June 28, 1939

4 Claims. (Cl. 309—23)

This invention relates to packing rings, cup washers and the like, such as are commonly used for piston and like packings in order to prevent leakage of fluid between a pair of members which are relatively movable telescopically.

It is the primary object of the invention to provide an improved form of piston or like packing which is arranged to have an exceptionally long working life and which may be constructed from materials enabling the working friction to be less than hitherto.

In a piston or like packing composed of soft material such as rubber and arranged to be carried by one member so that one of its surfaces co-operates slidably with the surface of the other member according to the present invention the said surface of the packing is provided with a layer of relatively hard and rigid wear-resisting material which may conveniently have one or more divisions extending in an axial sense, thereby enabling the said material to be more readily expanded and forced into intimate sealing contact with the surface of said other member. The term "axial sense" is not intended to be limited to cases in which the division or divisions lie parallel with the axis of the piston and cylinder or like members, as of course, said division or divisions can be arranged helically and may even extend at such an inclination to the axis that the layer of relatively hard and rigid wear-resisting material comprises more than one complete convolution extending around the packing. In some cases the layer may be in the form of a continuous, i. e. unsplit, ring.

Further, there is provided according to the invention a piston or like packing composed of soft material, such as rubber, and arranged to be carried by one member so that one of its surfaces co-operates slidably with the surface of the other member, characterised by the fact that the packing has, upon that surface which co-operates with said other member, a plurality of thin arcuate segments composed of relatively hard and rigid wear-resisting material, said segments being secured to the soft material, which latter extends between the segments to engage with the surface of said other member, and thus provide a seal between said segments.

According to a further aspect of the invention a piston or like packing ring is provided comprising in combination, a ring of soft material, such as rubber, and a terminate layer of relatively hard and rigid wear-resisting material adapted to be pressed by the soft material against the surface of that member relative to which the packing is required to slide.

Preferably the hard layer is composed of synthetic resin, said hard layer conveniently being intimately attached to the soft material by vulcanising, cementing or the like. Said layer may if desired comprise a plurality of thin arcuate segments which are substantially rhomboidal in shape and are spaced apart, with ribs of soft rubber or like material conveniently filling the spaces between said segments. Alternatively the hard layer may comprise a helix extending around the packing for more than one complete turn, the space or spaces separating the adjacent turns being occupied by soft material and in this construction the soft material can conveniently be formed with a helical groove for the reception of the hard layer, the latter being sprung into position within said groove. In another modification the packing is in the form of a packing cup and has its lip portion provided with the hard layer which is adapted to slide upon the surface of the above mentioned other member.

The invention is illustrated by way of example in the accompanying drawing, in which.

Figure 1:
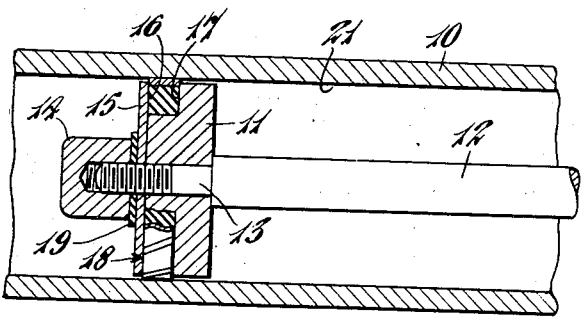
Figure 1 is a sectional elevational through a cylinder containing a piston fitted with the improved packing.

In Figure 1 the cylinder is indicated at 10 and is fitted with an axially slidable piston 11 secured to a piston rod 12 having a screw-threaded spigot 13 of reduced diameter and a cap nut 14. The piston 11 has an end plate 15 which is held in position by the nut 14 and constitutes one side wall 16 of a groove 17 for the reception of a packing ring 18 according to the invention. Owing to the fact that the plate 15 is removable the packing 18 can be slid into position upon the piston 11 during assembly without having to be stretched over the side wall of the groove 17. A washer 19 between the nut 14 and the plate 15 serves to prevent leakage of fluid along the spigot 13.

Figure 2:
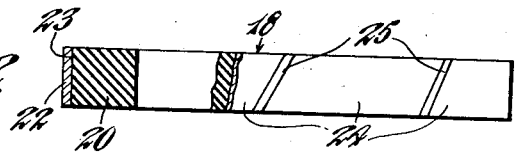
Figure 2 is a side elevation of the packing ring drawn to an enlarged scale and shown partly in section.
Figure 3:
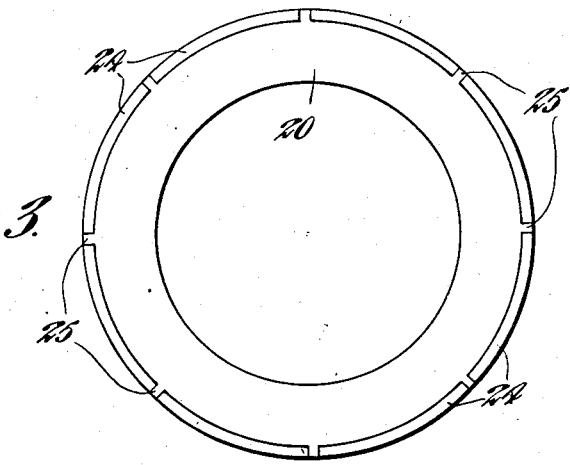
Figure 3 is a front elevation of the ring shown in Figure 2.

The construction of the packing 18 is shown more clearly in Figures 2 and 3 and it comprises a ring 20 of relatively soft elastic material such as soft rubber, said ring being of rectangular shape so as to fit snugly within the groove 17 of the piston 11. Its outer surface is, of course, required to slide against the interior 21 of the cylinder 10, and in order to extend the life of the packing and at the same time reduce the working friction, a layer 22 of relatively hard and rigid wear-resisting material such as synthetic resin is firmly secured to the outer surface 23 of the ring 20 conveniently by vulcanising, cementing or the like. In the forms shown in Figures 2 and 3 the layer 22 is not in one piece, but is composed of a series of segments 24, each of which is arcuate so as to engage snugly with the interior 21 of the cylinder 10 and is substantially rhomboidal in shape. The segments 24 have their adjacent pairs of oblique edges separated slightly and the intervening spaces are completely filled by helical ribs 25 of soft rubber formed in one with the material of the ring 20, said ribs lying flush with the outer surface of the segments 24, or even being arranged to project slightly so that they engage resiliently with the interior 21 of the cylinder 10, thus producing a continuous seal around the whole periphery of the piston 11. When the packing is installed the ring 20 acts to force the segments 24 into firm but uniform contact with the cylinder, this being due either solely to the elastic nature of the ring 20 and the close manner in which said ring fits within the groove 17, or else being dependent partly or wholly upon the effect of the pressure fluid which is being sealed. In the latter instance the axial width of the ring 20 may be arranged to be less than the corresponding measurement of the groove 17, so that the pressure fluid is able to enter the space so formed and cause said ring to expand radially by compressing it in an axial direction. Although material such as synthetic resin would normally be far too rigid to form an efficient seal of itself, it will be seen that the provision of a thin layer of this material in conjunction with a ring of soft rubber gives the desired result, as the thin layer is sufficiently flexible to conform to the curved surface of the cylinder, and it is at the same time quite robust owing to the support imparted to it by the rubber ring 20. It will be realised that the ribs 25 may be arranged at any desired inclination, or may be parallel with the axis of the packing, while any number of segments 24 may be provided. It is possible for the hard layer 22 to be formed as a single continuous ring, or as a ring which is split at one part of its circumference to give the necessary resilience.

Figure 4:
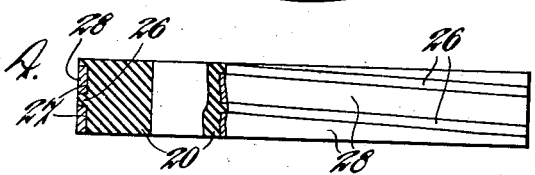
Figure 4 is a side elevation of a modified construction of ring shown partly in section.

In the modified form of packing shown in Figure 4 the ring 20 of soft rubber or like material is moulded or otherwise shaped with a helical rib 26 somewhat resembling a screw thread, and into the groove 27 so formed a helix 28 of relatively hard material such as synthetic resin is sprung. The rib 26 has its outer surface substantially flush with the surface of this helix and thus prevents leakage of pressure fluid past the packing, even at fluid pressures which are insufficiently high to cause axial compression and consequent radial expansion of the rubber or like ring 20. Owing to the fact that the helix 28 is terminate it is capable of adjusting itself to fit accurately against the interior surface 21 of the cylinder 10 when it is pressed outwards by the rubber ring 20, thus producing upon the packing an outer surface which fits the cylinder in an efficient manner and yet is sufficiently hard to have a long working life.

Figure 5:
Figure 5 is a fragmentary section showing the adaptation of the invention to a packing cup.

The above described improvements are applicable to packings other than those in the form of resilient rings, and Figure 5 shows one adaptation for the purpose of providing a wear-resisting surface on a packing cup. In this case the customary lip of the cup is indicated at 29 and it is provided with a hard layer 22 of synthetic resin or other suitable material arranged in the form of segments similar to those in Figures 2 and 3. If desired, of course, the hard layer can be in the form of a helix similar to that shown in Figure 4.

Figure 6:
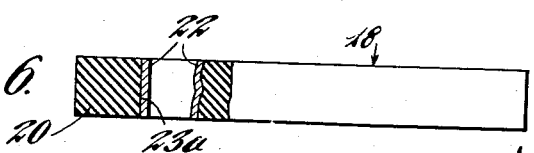
Figure 6 is a partly sectioned side elevation of a packing ring for use in a housing.

In all the above examples the hard layer is provided upon the outer curved surface of the packing member, but it will be appreciated that similar arrangements can readily be employed where the packing ring or cup is secured in a housing (not shown) and is adapted to maintain fluid-tight connection with a piston rod or like member sliding through said housing. A construction suitable for this purpose is shown in Figure 6, where the rubber or like ring 20 is provided upon its interior surface 23a with a layer 22 of hard wear-resisting material. This layer may be split as before or may comprise a helix of the form shown in Figure 4, while in cups for sliding engagement with plunger rods and the like, the hard layer would be provided upon an inwardly facing lip of the cup. The invention is not limited to packings composed of soft rubber and synthetic resin, as of course various other materials having the desired properties may be used.

What I claim is:

1. A packing ring for effecting a substantially fluid-tight seal between a pair of telescopically slidable surfaces, one of which has a circumferential groove accommodating the packing, said packing ring comprising an endless backing ring of relatively soft resilient rubber which backing is adapted to be stretched over the wall of the said circumferential groove, a helical rib formed upon that surface of the backing ring which faces the ungrooved slidable surface, and a separate helix of relatively hard wear-resisting material arranged to be sprung into engagement with the surface of the backing ring so that the helical rib on the backing fits between the adjacent turns of the wear-resistant helix and engages with the said ungrooved slidable surface.

2. A packing ring for effecting a substantially fluid-tight seal between a pair of telescopically slidable surfaces, one of which has a circumferential groove accommodating the packing, said packing ring comprising an endless backing ring of relatively soft resilient rubber which backing is adapted to be stretched over the wall of the said circumferential groove, a helical rib of soft rubber formed upon and projecting from the exterior of the backing ring, and a separate helix of wear-resistant synthetic resin arranged to be sprung into engagement with the surface of the backing ring so that the helical rib on the backing fits between the adjacent turns of the wear-resistant helix and engages with the said ungrooved slidable surface.

3. A packing ring for effecting a substantially fluid-tight seal between a pair of telescopically slidable surfaces, one of which has a circumferential groove accommodating the packing, said packing ring comprising an endless backing ring of relatively soft resilient rubber which backing is adapted to be stretched over the wall of the said circumferential groove, a helical rib of soft rubber formed upon and projecting from the exterior of the backing ring, and a separate helix of wear-resistant synthetic resin the turns of which are relatively thin radially by comparison with their axial width, said helix being arranged to be sprung into engagement with the surface of the backing ring so that the helical rib on the backing fits between the adjacent turns of the wear-resistant helix and engages with the said ungrooved slidable surface.

4. A packing ring for effecting a substantially fluid-tight seal between a pair of telescopically slidable surfaces, one of which has a circumferential groove accommodating the packing, said packing ring comprising an endless backing ring of relatively soft resilient rubber which backing is of relatively short axial length compared with its diameter, a helical rib formed upon that surface of the backing ring which faces the ungrooved slidable surface, and a separate helix of relatively hard wear-resisting material arranged to be sprung into engagement with the surface of the backing ring so that the helical rib on the backing fits between the adjacent turns of the water-resistant helix and engages with the said ungrooved slidable surface.

JOHN HENRY ONIONS.